(12) United States Patent
Lim

(10) Patent No.: US 7,715,327 B2
(45) Date of Patent: May 11, 2010

(54) METHOD FOR ADAPTIVELY REASSIGNING ADDRESSES OF NODES ACCORDING TO CHANGES IN VOLUME OF WIRELESS NETWORK

(75) Inventor: Yu-jin Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 901 days.

(21) Appl. No.: 11/192,359

(22) Filed: Jul. 29, 2005

(65) Prior Publication Data
US 2006/0023643 A1  Feb. 2, 2006

(30) Foreign Application Priority Data
Jul. 29, 2004  (KR) ...................... 10-2004-0059610

(51) Int. Cl.
*H04L 12/28* (2006.01)
(52) U.S. Cl. ....................................... 370/254; 370/913
(58) Field of Classification Search ................. 370/241, 370/254, 400, 913
See application file for complete search history.

(56) References Cited
U.S. PATENT DOCUMENTS 7,002,938 B2 * 2/2006 Hester et al. ................ 370/330
7,145,906 B2 * 12/2006 Fenner ........................ 370/392
7,359,972 B2 * 4/2008 Jorgensen ................... 709/226
2004/0018839 A1 * 1/2004 Andric et al. ............... 455/433
2004/0117513 A1 * 6/2004 Scott ............................. 710/1
2005/0152394 A1 * 7/2005 Cho ........................... 370/442

* cited by examiner

*Primary Examiner*—Dang T Ton
*Assistant Examiner*—Nourali Mansoury
(74) *Attorney, Agent, or Firm*—Sughrue Mion, PLLC

(57) ABSTRACT

A method of adaptively reassigning addresses of nodes according to changes in volume or a wireless network. The method includes receiving, at the node of the wireless network, information according to the changes in volume from a coordinator as a top level of the tree structure, calculating, at the node, a family tree indicating information and a location of the node in the tree structure according to an old logical address of the node and the information, and calculating a new logical address of the node according to the change in volume and the calculated family tree; and transceiving, at the node, a data packet according to the newly calculated logical address. Accordingly, overheads of the whole network for changing addresses may be reduced when changes in volume of the network occur, so that dynamic changes in volume of the network may be rapidly and actively implemented.

19 Claims, 6 Drawing Sheets

FIG. 3A

```
Calculation of Family Tree
Computing the Cskip_old[Lm_old];
Address := Org_Addr;
Ancestor_Addr := 0;
Repeat until i = Lm or Org_Addr = Ancestor_Addr
    Family_Tree[i] := |Address / Cskip_old[Li]| ;
    Ancestor_Addr := Ancestor_Addr + Cskip_old[Li]*(Family_Tree[i]-1) + 1;
    Address := Address - Ancestor_Addr;
```

FIG. 3B

```
Calculation of new logical Address
Computing the Cskip_new[Lm_new]
New_Addr := 0;
Repeat
    New_Addr := New_Addr +Cskip_new[i]*(Family_Tree[i]-1) + 1;
```

METHOD FOR ADAPTIVELY REASSIGNING ADDRESSES OF NODES ACCORDING TO CHANGES IN VOLUME OF WIRELESS NETWORK

CROSS-REFERENCE TO RELATED APPLICATIONS

This application claims benefit under 35 U.S.C. §119 from Korean Patent Application No. 2004-59610 filed on Jul. 29, 2004, the entire content of which is incorporated herein by reference.

BACKGROUND OF THE INVENTION

1. Field of the Invention

The present invention relates to a method of reassigning addresses and, in particular, to a method of adaptively reassigning addresses of nodes according to changes in volume of a wireless personal area network such as Zigbee network.

2. Description of the Related Art

In recent years, a Personal Area Network (PAN) gains popularity and attention in contrast to a Local Area Network (LAN) or a Wide Area Network (WAN). The PAN allows devices owned by respective persons to form one network for the sake of convenience, which may be implemented in a wireless network field, so that it is referred to as a Wireless PAN (WPAN).

IEEE (Institute of Electrical and Electronics Engineers) 802.15, a Working Group 15, sets the WPAN as a standard of a short range wireless network. The IEEE 802.15 includes four Task Groups (TG) under the WPAN. IEEE 802.15.1, Task Group 1, deals with the famous Bluetooth, IEEE 802.15.2, Task Group 2, deals with coexistence of Wireless LAN (IEEE 802.11) and Wireless PAN, IEEE 802.15.3 and IEEE 802.15.3a, Task Group 3 is in fact two groups: a Group 3 which deals with WPAN High Rate and a Group 3a which deals with WPAN Alternate Higher Rate. In short, both groups deal with high rate WPAN standards (20 Mbit/s or higher), and IEEE 802.15.4, a Task Group 4, also referred to as Zigbee, performs standardization on a low rate WPAN of 250 kbps or less.

In particular, in case of the ZigBee, standardization is conducted on a protocol stack, which operates above the IEEE 802.15.4 PHY/MAC layer for a wireless sensor network by the ZigBee Alliance, which is a federation of companies for building a low power monitoring control system with reliable and cost-effective features.

One of the main functions of the Zigbee network protocol is to allocate logical addresses for building a cluster tree. The cluster tree is formed by setting the ZigBee coordinator as a top level root and connecting all nodes within the ZigBee network as a sub tree structure to the top level root. When the ZigBee network is formed to build the tree, each node is allocated a logical address from its parent node. Such a 16-bit logical address is used within the ZigBee network instead of the old IEEE-64 bit address, to thereby reduce the packet size.

The ZigBee coordinator determines the number of maximum child nodes "Cm" each parent node may have and also determines the number of the maximum levels or depths "Lm" in the tree in order to allocate a logical address to each node when the Zigbee network is formed. Each parent node calculates the block size and Cskip, and receives an allocated logical address block to be used by its child node(s) from the ZigBee coordinator based on the determination of the Cm and Lm values.

After the network is formed by allocating addresses as described-above, the volume of the network may need to be changed by expanding or reducing the size of the network.

For example, when the number of maximum child nodes, which is initially determined, needs to be expanded from four to five or more in response to the change in network volume or when the number of maximum levels needs to be expanded from three to four or more, each address of the nodes allocated from the Zigbee coordinator must be changed when the network is formed.

However, a method of changing the values of Lm and Cm determined by the Zigbee coordinator when the network is formed is not taken into account in the conventional Zigbee network. Accordingly, in order for the Zigbee coordinator to change the values of Lm and Cm after the network is initially formed, all nodes within the Zigbee network must perform a new network join procedure to receive newly allocated logical addresses from the respective parent nodes.

According to this approach, even when each node skips the network discovery procedure to immediately perform the network join procedure, $2(n-1)$ times of packet transmission is required for a Zigbee network of n nodes, which causes network resources to be wasted. In addition, during the reassignment of addresses in accordance with the above-described procedure, the data packet transmission is not normally performed, which causes network overheads to be increased so that the whole data transmission becomes delayed.

Meanwhile, each node retains in an address mapping table 64-bit IEEE addresses of the other nodes but not its own 64-bit IEEE address and 16-bit logical address information mapped thereto. However, when Lm and Cm are changed, the logical address of each node retained in the address mapping table is changed so that the information of the address mapping table is no longer valid, which requires an additional packet to be exchanged in order to update the information of the address mapping table. Accordingly, additional network resources must be wasted.

SUMMARY OF THE INVENTION

It is therefore one aspect of the present invention to provide a method of adaptively reassigning addresses of nodes according to changes in volume of a WPAN, which allows the old logical address system to be changed to a new logical address system for each node without causing an additional packet overhead when nodes are added into the wireless network to change the network volume so that an amount of transmission data required when the addresses are reassigned may be reduced.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

According to an exemplary embodiment of the present invention, there is provided a method of adaptively reassigning addresses of nodes according to changes in volume of a tree structure wireless network, which includes: receiving, at the node of the wireless network, information according to the changes in volume from a coordinator as a top level of the tree structure; calculating, at the node, a family tree indicating the information and a location of the node in the tree structure according to an old logical address of the node and then calculating a new logical address of the node according to the change in volume and the calculated family tree; and transceiving, at the node, a data packet according to the newly calculated logical address.

The information may include the number of maximum child nodes and the number of maximum levels determined by the change in volume.

In addition, the family tree represents a rank of the node at each level of the tree structure.

In addition, the family tree, Family.Tree[i], indicates a rank of the node at an $i^{th}$ level.

The rank of the node at the $i^{th}$ level may be calculated using the following equation:

Family.Tree[$i$]:=|Address/$C$skip.old[$Li$]|

Ancestor.Addr:=Ancestor.Addr+$C$skip.old[$Li$]*(Family.Tree[$i$]−1)+1)

Address:=Address−Ancestor.Addr wherein Address is an old logical address of the node, Cskip.old[Li] is a value calculated according to the number of old maximum child nodes and the number of old maximum levels, and |Address/Cskip.old[Li]| is a minimum value among integers which are equal to or greater than Address/Cskip.old[Li].

In addition, the new logical address is calculated according to the following equation:

$$\text{New} \cdot \text{Addr} = \sum_{i} (Cskip \cdot \text{new}[i] * (\text{Family} \cdot \text{Tree}[i] - 1) + 1)$$

wherein Cskip.new[i] is a value calculated according to the number of maximum child nodes and the number of maximum levels transmitted from the coordinator.

In this case, Cskip.old[Li] and Cskip.new[i] are calculated according to the following equation:

$$Bsize = \frac{1 - C_m^{Lm+1}}{1 - C_m}$$

$$Cskip = \text{Floor}\left[\frac{Bsize - \sum_{k=0}^{Li}(C_m)^k}{(C_m)^{Li+1}}\right]$$

wherein Cm is the number of maximum child nodes, and Lm is the number of maximum levels.

The node may place a mark that the new logical address is used on a predetermined reserved bit of a header portion of the data packet to transmit the data packet.

The node transmits the data packet according to the new logical address when the node receives the data packet indicating that the new logical address is used for the predetermined reserved bit.

The method may further include calculating a family tree of other nodes included in an address mapping table stored in the node by using the information and thus calculating respective new logical addresses to update the address mapping table.

In addition, the node transceives the data packet according to the address mapping table.

The node may transceive the data packet by using both of the new logical address and the old logical address in combination for a predetermined time.

In addition, the node places a mark on the data packet indicating one of the old logical address and the new logical address and transceives the data packet.

In addition, the method may further include buffering the data packet until the node receives information according to the change in volume from the coordinator when the node receives the data packet indicating that the new logical address is used. However, the data packet is preferably discarded when the node is short of memory.

Meanwhile, the node places a mark that the new logical address is used using a predetermined reserved bit of a header portion of the data packet, and the data packet is preferably transmitted according to the new logical address when the data packet is received which has placed the mark that the new logical address is used on the predetermined reserved bit.

In addition, the data packet is transmitted according to the old logical address when the data packet is received which does not have the mark that the new logical address is used on the predetermined reserved bit.

The predetermined time may be set according to a time that the information is transmitted from the coordinator to the whole wireless network.

The wireless network may be a Zigbee wireless network based on an IEEE 802.15.4 standard.

BRIEF DESCRIPTION OF THE DRAWINGS

The above aspects and features of the present invention will be more apparent by describing certain exemplary, non-limiting embodiments of the present invention with reference to the accompanying drawings. In the drawings, the same reference characters denote analogous elements, in which:

FIGS. 3A and 3B are exemplary formulas for explaining a method of reassigning addresses in accordance with the present invention;

DETAILED DESCRIPTION OF THE ILLUSTRATIVE, NON-LIMITING EMBODIMENTS

Hereinafter, the illustrative, non-limiting embodiments of the present invention will be described in detail with reference to the accompanying drawings.

The routing method according to the illustrative embodiment of the present invention, by way of an example, is applied to a Zigbee wireless network having a tree structure based on the IEEE 802.15.4 standard. However, the present invention is not limited thereto, but may be applied to other wireless networks which meet the requirements of the present invention.

Figure 1:
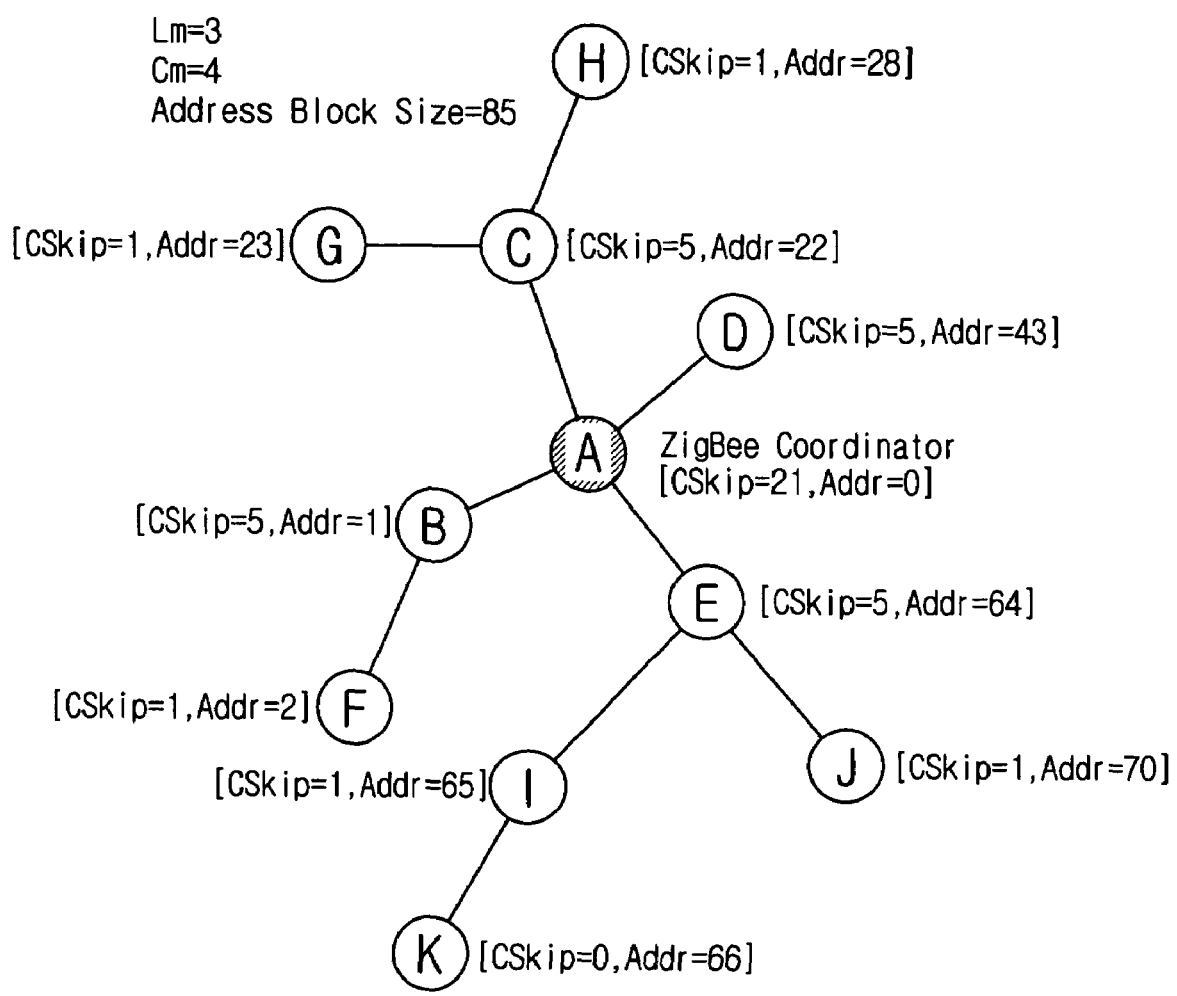
FIG. 1 illustrates an example of a wireless network for explaining a method of assigning addresses when the network is formed.

FIG. 1 illustrates an example of a Zigbee wireless network for explaining a method of assigning addresses when the network is formed.

Referring to FIG. 1, the exemplary Zigbee wireless network has a tree structure, in which, the Zigbee coordinator A is set as the top level node, a first sub level of the top level node is formed of the child nodes B, C, D and E, a second sub level is formed of the child nodes F, G, H, I and J, and the bottom level is formed of a child node K. The Zigbee network of the present example has the number of maximum child nodes defined as "Cm=4" (each parent node has a maximum of four child nodes) and the number of maximum levels defined as "Lm=3" (levels 0, 1, 2, and 3), when the network is formed.

The Zigbee coordinator A calculates "Bsize" and "Cskip" representing the block size or the total address space of the network based on the number of maximum child nodes and the number of maximum levels.

The Zigbee coordinator calculates the "Bsize" representing the block size or the total address space by using the following equation:

$$Bsize = \frac{1 - C_m^{Lm+1}}{1 - C_m} \qquad \text{Equation 1}$$

Wherein "Cm" indicates the number of maximum child nodes that their parent node may have, and "Lm" indicates the number of maximum levels in the corresponding network.

When the "Bsize" is calculated, the Zigbee coordinator calculates the "Cskip" (described in further detail below) of each node by using the following equation:

$$Cskip = \text{floor}\left[\frac{Bsize - \sum_{k=0}^{Li}(C_m)^k}{(C_m)^{Li+1}}\right] \qquad \text{Equation 2}$$

wherein "Li" indicates the level in the network (e.g., from 0 to 3 in the network depicted in FIG. 1), "Cm" indicates the number of maximum child nodes that the parent nodes may have, and Bsize is calculated using the above-described equation 1.

As a result, when "Cm" is 4 and "Lm" is 3 as is set in the example depicted in FIG. 1, "Bsize" becomes 85 [(1−4⁴)/(1−4)], which may be substituted in the equation 2, so that "Cskip" of each level may be calculated as shown in the table 1 below.

TABLE 1

| Li (Level in the network) | Cskip |
|---|---|
| 0 | 21 |
| 1 | 5 |
| 2 | 1 |
| 3 | 0 |

Accordingly, when the network is formed, the Zigbee coordinator A of the exemplary Zigbee network of FIG. 1 allocates an address of each node based on the "Cskip" value of each level calculated as described above.

For example, the Zigbee coordinator A is allocated an address of "0" and the child node B is allocated an address of "1", and the "Cskip" value is 21 at the "0" level (the Cskip value of the Zigbee coordinator A depicted in FIG. 1), so that addresses of child nodes C, D and E are allocated "1+21=22", "22+21=43", and "43+21=64", respectively. In addition, the parent node C has the "Cskip" value of 5 at the "1" level so that an address of the child node G is allocated "23" and an address of the node H is allocated "23+5=28". Similarly, the child node I (the child of the node E) is allocated an address of "64+1=65" and the child node J (the child of the node E) is allocated an address of "65+5=70".

Figure 2:
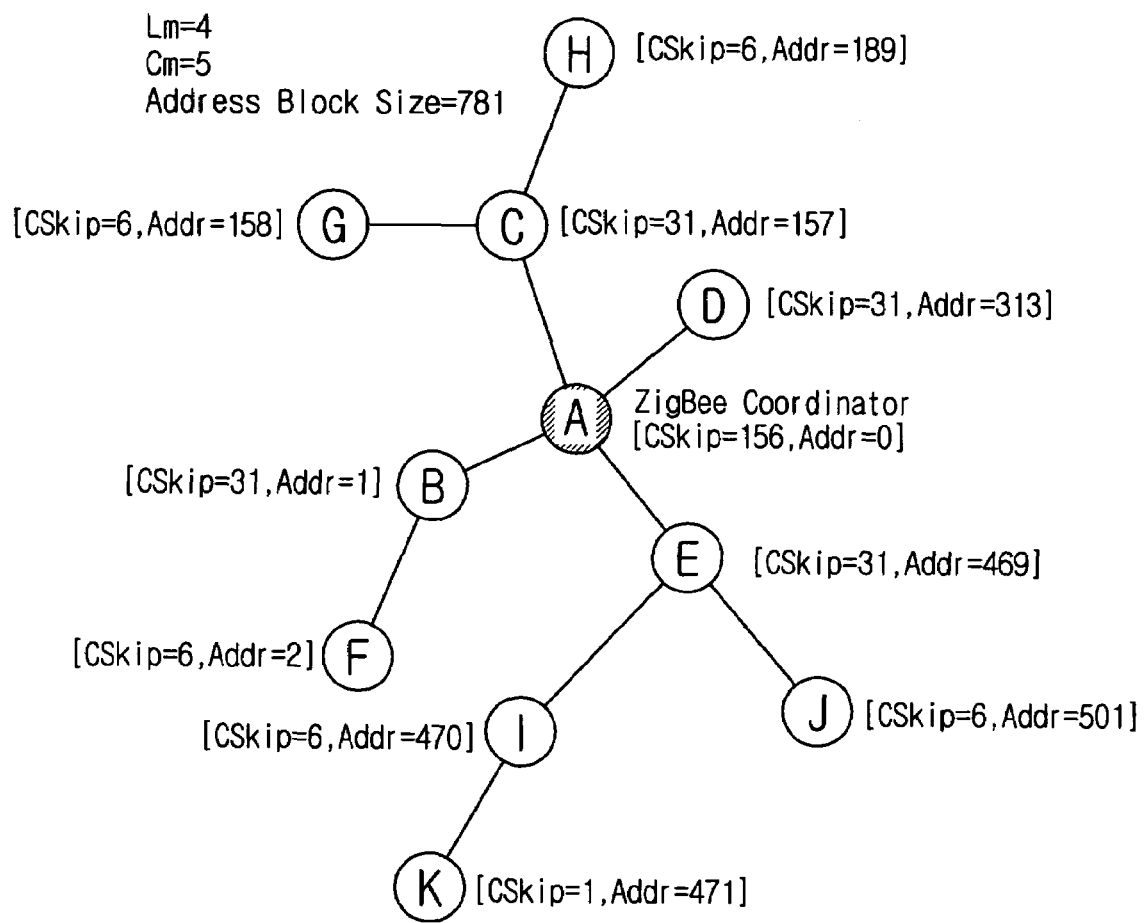
FIG. 2 illustrates an example of a wireless network for explaining a method of reassigning addresses in accordance with the exemplary, non-limiting embodiment of the present invention.
Figure 4:
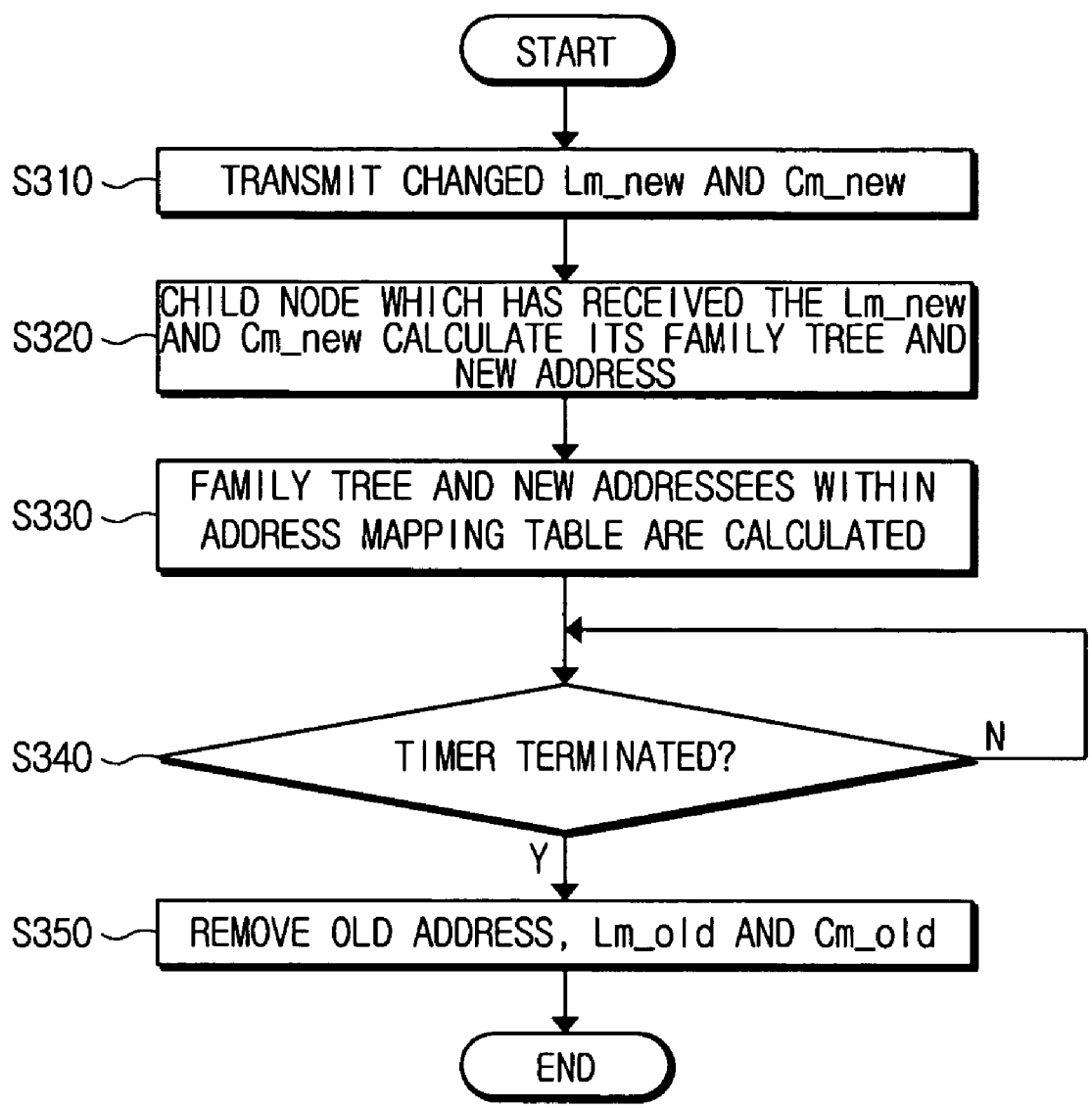
FIG. 4 is a flow chart provided for explaining a method of reassigning addresses in accordance with the exemplary embodiment of the present invention.

FIG. 2 illustrates an example of a wireless network for explaining a method of reassigning addresses in accordance with the illustrative, non-limiting embodiment of the present invention. FIGS. 3A and 3B are exemplary formulas or pseudo code for explaining a method of reassigning addresses in accordance with the illustrative, non-limiting embodiment of the present invention. Moreover, FIG. 4 is a flow chart provided for explaining a method of reassigning addresses in accordance with the exemplary embodiment of the present invention. Hereinafter, the method of reassigning addresses according to the exemplary embodiment of the present invention will be described in detail with reference to FIGS. 2 to 4.

The number of maximum child nodes and the number of maximum levels are fixed in the Zigbee network when the network is initially formed. Accordingly, the old tree structure has a limit in allowing the number of nodes to additionally join the network after the network is formed. As a result, when a plurality of nodes joins the network, the above-described number of maximum child nodes and the number of maximum levels must be inevitably changed.

Referring to FIG. 2, the exemplary Zigbee wireless network corresponds to a case where the network volume is changed in the Zigbee wireless network of FIG. 1 so that the number of maximum child nodes set when the network is initially formed is increased from "Cm=4" to "Cm=5", and similarly, the maximum number of levels is increased from "Lm=3" to "Lm=4".

As a result, when it is needed to change the "Cm" and/or "Lm" values due to the change in volume of the network, the Zigbee coordinator A determines new "Cm" and "Lm" values to accommodate for the change in volume of the network and then, the Zigbee coordinator A transmits the new values to the whole network (as depicted in step S310 of FIG. 4).

The node which has received the new "Cm" and "Lm" values, first calculates its family tree and then calculates a new logical address (step S320 of FIG. 4).

The family tree indicates the location of each node in the tree structure network. For example, the family tree indicates which child rank the node corresponds to at each level. That is, the family tree indicates ranks of respective nodes at each level e.g., 4$^{th}$ child on the first level or first child at the zero level. The family tree may be expressed, for example, as a vector of integers relative to each level. The family tree may be calculated by using the equations 1 and 2 in the reverse order.

That is, the old "Cm" and "Lm" values may be substituted in the equations 1 and 2 so that the "Bsize" indicating the block size or the total address space of the network and the "Cskip" at each level may be calculated. Accordingly, the above-described method of calculating the addresses may be calculated back from the old logical address value of the corresponding node so that the level and child ranks of the node may be calculated.

FIG. 3A depicts a formula or a pseudo code for explaining a method of calculating the family tree in order to calculate a new logical address. Referring to FIG. 3A, initially, "Cskip_old[Lm_old]" is calculated relative to the old number of maximum levels "Lm_old" and the old logical address "Org_Addr", and the parent node address "Ancestor_Addr" is set to "0", and the value of "i" is increased to calculate the family tree "Family_Tree[i]" according to the equation shown in FIG. 3A.

Referring to the exemplary node I of FIG. 2, since "Cm_old" is 4 and "Lm_old" is 3, "Bsize" is 85, "Cskip[0]" is 21, and "Cskip[1]" is 5. In addition, since the address of the node I is "65", the family tree is calculated as follows: Family_Tree[1]:=⌊Org_Addr/Cskip_old[Li]⌋=⌊65/21⌋=4. In this case, ⌊f⌋ indicates a minimum value among integers which are equal to or greater than f.

Moreover, Ancestor_Addr:=Ancestor_Addr+Cskip_old[Li]*(Family_Tree[i]−1)+1=0+21*3+1=64, and Address:=Address−Ancestor_Addr=65−64=1 are obtained. Accordingly, Family_Tree[2]=⌊Address/Cskip_old[Li]⌋=⌊1/5⌋=1 is obtained in the next time repetition. Accordingly, the family tree "Family_Tree[i]" is calculated as follows: Family_Tree[1]=4, Family_Tree[2]=1, which indicates that the node I corresponds to the first child at the second level of the fourth child node at the first level of the Zigbee coordinator.

The node which has received the new "Cm" and "Lm", namely, "Cm_new" and "Lm_new" calculates the family tree and then calculates the new logical address.

FIG. 3B is a formula or pseudo code for explaining a method of calculating a new logical address according to the calculated family tree. Referring to FIG. 3B, the equations 1 and 2 are used to set the new logical address "New_Addr" to "0" and New_Addr+Cskip_new[i]*(Family_Tree[i]−1)+1 is calculated to repeatedly update the New_Addr.

Referring to the exemplary node I of FIG. 2, when the equations 1 and 2 are applied with "Cm_new=5" and "Lm_new=4", the address block size "Bsize" is 781 and Cskip_new[0] is 156 and Cskip_new[1] is 31. In addition, the family tree has Family_Tree[1]=4 and Family_tree[2]=1, so that New_Addr:=0+156*(4−1)+1=469 is obtained at the first repetition for calculating the new logical address of the new node I, and New_Addr:=469+31*(1−1)+1=469+1=470 is obtained in the second repetition. Accordingly, it can be seen that the new logical address of the node I is "470".

Meanwhile, in order to update the old logical addresses of other nodes recorded in the address mapping table managed by the node which has received the new "Cm" and "Lm" with new logical addresses corresponding to the new "Cm" and "Lm" values, the node calculates the family tree of the other nodes which know the old logical addresses in accordance with the above-described method to thereby calculate the new logical addresses (step S330).

In addition, after the calculation of the new logical address according to the changed "Cm" and "Lm", the node which has received the new "Cm" and "Lm" sets a timer for a time sufficient for allowing a transmission of the changed "Cm" and "Lm" to be completed for all the nodes within the network to thereby calculate the new logical addresses. The time set by the timer is determined by the volume of the network and the packet transmission time and/or rate within the network.

Accordingly, the node checks whether the set time has been reached by the timer (step S340), and removes the information about the old network such as Lm_old and Cm_old including the old logical address when the set time has been reached by the timer (step S350).

As a result, a new logical address in response to the new "Cm" and "Lm" is calculated at each node, which leads to a completion of reassigning whole addresses of the network, so that data packets are transceived in accordance with the new logical addresses.

Each node of the wireless network may thus calculate its family tree information, and may calculate the new logical address using the calculated family tree and the new "Lm_new" and "Cm_new" values. In addition, each node may change not only its logical address but also logical addresses of other nodes retained in the address mapping table to new logical addresses without transmitting any additional data packets.

Meanwhile, since packets are transmitted along the tree structure in the Zigbee network, all nodes within the network do not receive Lm_new and Cm_new values at the same time when the Zigbee coordinator determines the new Lm and Cm values and transmits them to the whole network. As a result, there occurs a state where the new logical address and the old logical address co-exist in a mixed state while the Lm_new and Cm_new values are propagated to the whole network. Accordingly, in order to prevent a collision at the time of transceiving data packets while the two addresses co-exist in the mixed state, a method of transceiving the data packets according to the two addresses is required.

In order to discriminate packets transceived using the old logical address with packets transceived using the new logical address while a procedure of reassigning network node addresses according to the exemplary embodiment of the present invention is carried out, one bit among the reserved bits present in the packet header, for example, a reserved bit of a frame control field, is used as the new logical address bit to indicate that the address included in the packet is the new logical address changed according to the Lm_new and Cm_new.

In addition, the node which has received the Lm_new and Cm_new and calculated the new logical address maintains all of the old address and Lm_old and Cm_old for a predetermined time, which is set using a timer for maintaining the information. The timer preferably sets the predetermined time which is equal to or greater than a time indicating that a beacon frame is propagated from the Zigbee Coordinator to the leaf node.

Figure 5:
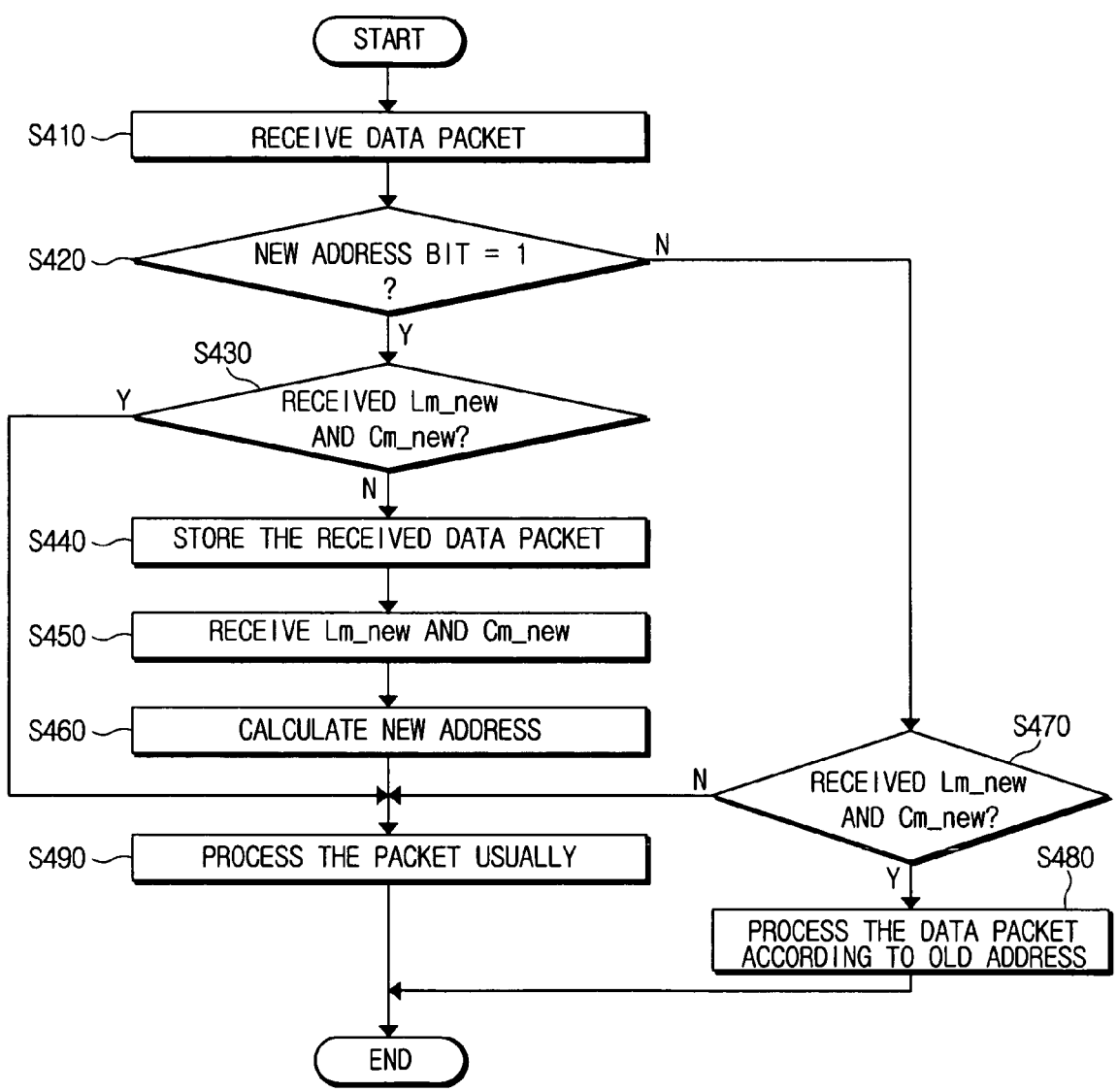
FIG. 5 is a flow chart provided for explaining a procedure of receiving data packets in response to address reassignment in accordance with the exemplary embodiment of the present invention.

FIG. 5 is a flow chart provided for explaining a procedure of receiving data packets in response to address reassignment in accordance with the exemplary embodiment of the present invention. The network having the same tree structure as FIG. 2 is employed to explain the flow chart of FIG. 5.

When one node within the network receives the data packet (step S410), it parses a header of the received data packet to check the value of the new address bit (step S420). In this case, the new address bit is represented, for example, as "1" when the packet corresponds to one transmitted in response to the new logical address changed according to Lm_new and Cm_new.

As a result, when the new address bit is "1", that is, when the received data packet includes the new logical address, the corresponding node determines whether it has received Lm_new and Cm_new values (step S430).

Since the node which has received Lm_new and Cm_new maintains its new logical address by calculating the new logical address as described above and updating the address of the address mapping table with the new logical address, it determines that a destination of the received data packet corresponds to the node itself or its child node according to the new logical address maintained by the node, and then transmits the data packet to the destination or processes data included in the packet when the node itself is the destination (step S490).

However, the node, which only has the old local address because it has not received yet the Lm_new and Cm_new values, stores the data packet received during a predetermined time (step S440). That is, the node sets the timer and buffers the received data packets until it receives the Lm_new and Cm_new values. The fact that the node has received the new address bit of "1" means that the Lm_new and Cm_new values are propagated up to the parent node of the corresponding node, so that a time for buffering the packet will be not long in this case. However, when the node does not receive the Lm_new and Cm_new values in a predetermined time set by the timer, it discards the buffered data packets.

Meanwhile, it is not suitable for the Zigbee RN-node which is limited in memory for buffering the data packet received as described above, so that the RN-node preferably discards the received data packets without buffering them.

When the node receives the Lm_new and Cm_new values while it buffers the received data packets before the predetermined time expires (step S450), the node calculates its new logical address and the new logical addresses of other nodes in the address mapping table based on the received Lm_new and Cm_new values (step S460). Accordingly, the node processes the buffered data packets according to the newly calculated addresses (step S490).

Meanwhile, when the new address bit of the received data packet is "0", the node determines whether it has already received the Lm_new and Cm_new values (step S470).

Even when the node has already received the Lm_new and Cm_new values, it still maintains the old logical address during a predetermined time until the predetermined period of time, set by the timer, expires. As a result, the node determines whether a destination of the received data packet according to the old logical address corresponds to the node itself or its child node and then performs packet processing such as transmitting the data packet to another node or processing the data itself (step S480).

However, when the node has not received the Lm_new and Cm_new values, it determines the destination of the received data packet based on the address mapping table and the logical address maintained by the node itself and then processes the data packet (step S490).

As a result, a problem may be overcome which may cause data packets to be lost due to the mixed co-existence of the new logical address and the old logical address while the Lm_new and Cm_new values are propagated through the network.

Figure 6:
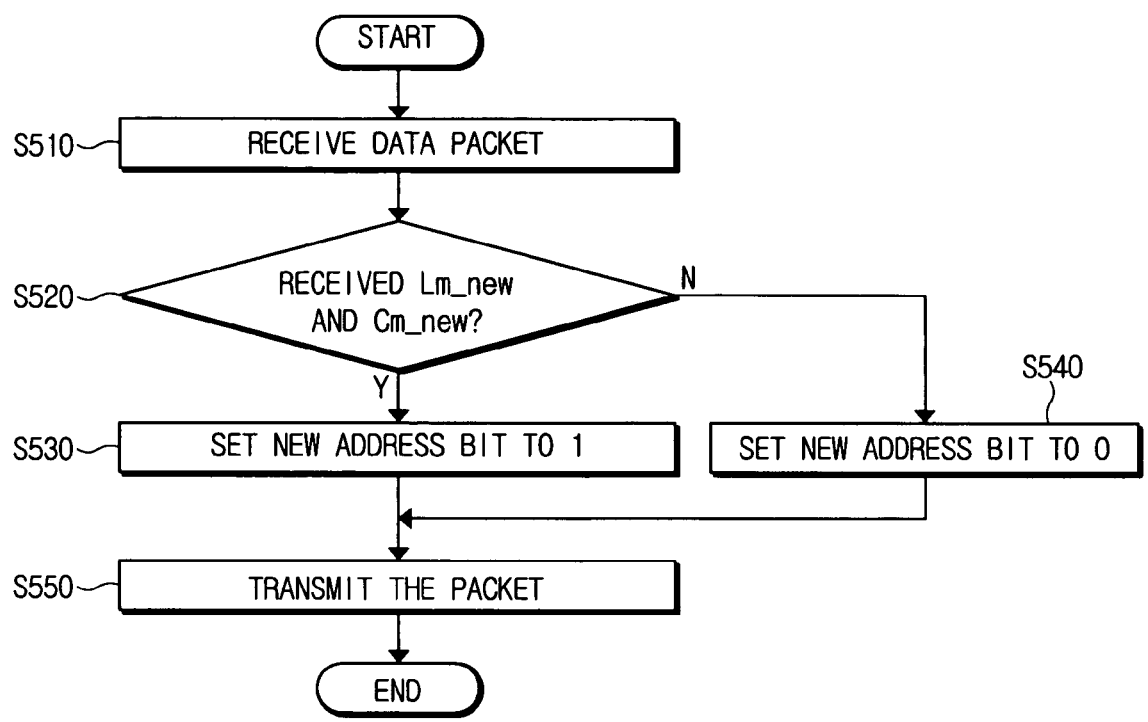
FIG. 6 is a flow chart provided for explaining a procedure of transmitting data packets in response to address reassignment in accordance with the exemplary embodiment of the present invention.

FIG. 6 is a flow chart provided for explaining a procedure of transmitting data packets in response to address reassignment in accordance with the exemplary embodiment of the present invention.

When a node receives a data packet from its upper layer which must be transmitted to another node (step S510), the node determines whether it has already received Lm_new and Cm_new values (step S520).

As a result, when the node has already received the Lm_new and Cm_new values, it sets the new address bit of the header of the data packet to "1" (step S530), and transmits the data packet to the new logical address of the destination node based on the address mapping table (step S550).

Meanwhile, when the node has not received the Lm_new and Cm_new values, it sets the new address bit of the packet header to "0" (step S540), and transmits the data packet to the logical address of the destination node based on the address mapping table (step S550). The new logical bit is set to "0" and the packet is transmitted, when the node has not received the Lm_new and Cm_new values, and the node which has received the transmitted packet determines whether it has received the Lm_new and Cm_new values when the new node bit is set "0" based on the above-described method of receiving the packet according to the exemplary embodiment of the present invention, and thus processes the packet.

Accordingly, even when the new Lm_new and Cm_new are determined to cause the addresses and the tree structure of the network to be changed to have the old address and the new address co-exist in a mixed state, the data packets may be effectively transceived without causing any address collisions.

According to the exemplary embodiment of the present invention as described above, a procedure of separately assigning new logical addresses in response to the changes in volume of network due to a plurality of nodes joined into the network is not carried out, but the new logical address is calculated by each node of the network to change the address and thus carry out transceiving the packet, so that whole overheads of the network for changing the addresses may be reduced.

According to the exemplary embodiment of the present invention, changes in node address in response to changes in volume of the network may be readily carried out without transceiving any overheads at the network, so that dynamic changes on volume of the network such as join and withdrawal of nodes at the network may be rapidly and positively made.

In addition, according to the exemplary embodiment of the present invention, when two addresses are present in a mixed state while the old logical address is changed to a new logical address, the old address is maintained for a predetermined time and data packets may be transceived using both addresses, so that the data packets may be prevented from being lost.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art. The principles and features of this invention may be employed in varied and numerous embodiments without departing from the scope and the spirit of the invention as defined by the appended claims and equivalents thereof.

What is claimed is:

1. A method of adaptively reassigning addresses of nodes according to changes in volume of a tree structure wireless network, comprising:

receiving, at each node of the wireless network, information according to the changes in volume from a coordinator as a top level of the tree structure;

calculating, at said each node, a family tree indicating a location of the respective node in the tree structure according to an old logical address of the respective node and the information;

calculating at said each node, a new logical address of the respective node according to the changes in volume and the calculated family tree; and transceiving, at the respective node, a data packet according to the newly calculated logical address;

wherein the information comprises the number of maximum child nodes and the number of maximum levels determined by the changes in volume.

2. The method as recited in claim 1, wherein the family tree represents a rank of the node at each level of the tree structure.

3. A method of adaptively reassigning addresses of nodes according to changes in volume of a tree structure wireless network, comprising:

receiving, at a node of the wireless network, information according to the changes in volume from a coordinator as a top level of the tree structure;

calculating, at the node, a family tree indicating a location of the node in the tree structure according to an old logical address of the node and the information;

calculating a new logical address of the node according to the changes in volume and the calculated family tree; and transceiving, at the node, a data packet according to the newly calculated logical address, wherein the information comprises the number of maximum child nodes and the number of maximum levels determined by the changes in volume, wherein the family tree represents a rank of the node at each level of the tree structure, and wherein the family tree: Family.Tree[i] indicates the rank of the node at $i^{th}$ level of the tree structure, wherein the rank of the node at the $i^{th}$ level is calculated using equation:

Family.Tree[i]:=|Address/Cskip.old[Li]|

Ancestor.Addr:=Ancestor.AddR+Cskip.old[Li]*(Family.Tree[i]−1)+1

Address:=Address−Ancestor.Addr wherein the Address is the old logical address of the node, the Cskip.old[Li] is a value calculated according to the number of old maximum child nodes and the number of old maximum levels, and the |Address/Cskip.old[Li]| is a minimum value among integers which are equal to or greater than the Address/Cskip.old[Li].

4. The method as recited in claim 3, wherein the new logical address is calculated according to the following equation:

$$\text{New} \cdot \text{Addr} = \sum_{i} (Cskip \cdot \text{new}[i] * (\text{Family} \cdot \text{Tree}[i] - 1) + 1)$$

wherein Cskip.new[i] is a value calculated according to the number of maximum child nodes and the number of maximum levels transmitted from the coordinator.

5. The method as recited in claim 3, wherein the Cskip.old [Li] is calculated according to the following equation:

$$Bsize = \frac{1 - C_m^{Ln+1}}{1 - C_m}$$

$$Cskip = \text{Floor}\left[\frac{Bsize - \sum_{k=0}^{Li}(C_m)^k}{(C_m)^{Li+1}}\right]$$

wherein Cm denotes the number of maximum child nodes, and Lm denotes the number of maximum levels.

6. The method as recited in claim 1, wherein the node places a mark indicating that the new logical address is used on a predetermined reserved bit of a header portion of the data packet, and transmits the data packet.

7. The method as recited in claim 6, wherein the node transmits the data packet according to the new logical address when the node receives the data packet indicating that the new logical address is used for the predetermined reserved bit.

8. The method as recited in claim 1, further comprising:
    calculating, at the node, a family tree of other nodes included in an address mapping table stored in the node by using the information and calculating respective new logical addresses of the other nodes based on the calculated family tree of other nodes, to update the address mapping table.

9. The method as recited in claim 8, wherein the node transceives the data packet according to the address mapping table.

10. The method as recited in claim 1, wherein the node transceives the data packet by using both of the new logical address and the old logical address in combination for a predetermined time such that the node is configured to determine destination of the data packet using the new logical address and configured to determine the destination of the data packet using the old logical address.

11. The method as recited in claim 10, wherein the node places a mark on the data packet indicating one of the old logical address and the new logical address is used and transceives the data packet.

12. The method as recited in claim 11, further comprising:
    buffering the data packet until the node receives the information according to the change in volume from the coordinator when the node receives the data packet indicating that the new logical address is used.

13. The method as recited in claim 12, wherein the data packet is discarded when the node is short of memory.

14. The method as recited in claim 10, wherein the node places a mark indicating that the new logical address is used using a predetermined reserved bit of a header portion of the data packet.

15. The method as recited in claim 14, wherein when the data packet indicating that the new logical address is used on the predetermined reserved bit is received, the data packet is transmitted according to the new logical address.

16. The method as recited in claim 14, wherein when the data packet which does not indicate that the new logical address is used on the predetermined reserved bit is received, the data packet is transmitted according to the old logical address.

17. The method as recited in claim 10, wherein the predetermined time is set according to a time that the information is transmitted from the coordinator to all elements of the wireless network and wherein, after the predetermined time, the node discards old logical addresses.

18. The method as recited in claim 4, wherein the Cskip.new[i] is calculated according to the following equation:

$$Bsize = \frac{1 - C_m^{Ln+1}}{1 - C_m}$$

$$Cskip = \text{Floor}\left[\frac{Bsize - \sum_{k=0}^{Li}(C_m)^k}{(C_m)^{Li+1}}\right]$$

wherein Cm denotes the number of maximum child nodes, and Lm denotes the number of maximum levels.

19. The method as recited in claim 3, wherein Cskip indicates a size of logical address block for child nodes and wherein parent node's Cskip is used in assigning addresses to respective child nodes of the parent node.

\* \* \* \* \*